United States Patent [19]
Lee

[11] Patent Number: 6,068,019
[45] Date of Patent: May 30, 2000

[54] BRANCH APPARATUS FOR PIPE AND A BRANCH METHOD USING THE SAME

[76] Inventor: Woo Kag Lee, 1 Dong 411 Ho, Dongseoul Hanyang Apartment 41, Dapsipri Dong, Dongdaemoon-Ku Seoul, Rep. of Korea

[21] Appl. No.: 09/115,219

[22] Filed: Jul. 13, 1998

[51] Int. Cl.[7] ............................................... F16K 43/00
[52] U.S. Cl. ......................................... 137/318; 137/317
[58] Field of Search .................................... 137/318, 317, 137/320; 285/288.1, 133.11, 125.1, 126.1; 138/97

[56] References Cited

U.S. PATENT DOCUMENTS

| | | | |
|---|---|---|---|
| 2,457,418 | 12/1948 | Turpin et al. | 285/126.1 |
| 3,891,249 | 6/1975 | Moore | 285/189 |
| 4,920,747 | 5/1990 | Haney | 60/324 |

*Primary Examiner*—David J. Walczak
*Attorney, Agent, or Firm*—Dougherty & Associates

[57] ABSTRACT

A branch apparatus for a pipe and a branch method using the same connect a branch pipe installed to a place requiring a fluid such as a gas, a chemical substance and water to a main pipe through which the fluid flows. The branch apparatus for a pipe and the branch method using the same make a laying depth of the main pipe be identical with that of the branch pipe by horizontally installing a branch apparatus, and thus make the branch pipe receive both a low vibration and a small load from the ground. The branch apparatus includes a T-type pipe having a horizontal pipe whose both ends are opened and a vertical pipe connected to an upper part of a center of the horizontal pipe; a reinforcement plate welded to the main pipe for being welded to one end of the horizontal pipe of the T-type pipe; a flange which is welded to an upper part of the vertical pipe of the T-type pipe, and has female screw lines in a center thereof; and a plug coupled with the center of the flange.

3 Claims, 7 Drawing Sheets

PRIOR ART

PRIOR ART

PRIOR ART

PRIOR ART

BRANCH APPARATUS FOR PIPE AND A BRANCH METHOD USING THE SAME

1. BACKGROUND OF THE INVENTION

1. Field of the Invention

The present invention relates generally to a branch apparatus for a pipe and a branch method using the same which connect a branch pipe installed to a place requiring a such as a gas, a chemical substance and water to a main pipe through which the fluid flows. More particularly, it relates to a branch apparatus for a pipe and a branch method using the same which make a laying depth of the main pipe be identical with that of the branch pipe by horizontally installing a branch apparatus, and thus make the branch pipe receive a low vibration and a small load from the ground.

2. Description of the Related Art

In recent years, most homes use a liquefied natural gas (LNG) as a household fuel, and buildings and houses mostly use the LNG as a fuel of a heating device. Accordingly, there are many gas pipes for supplying each home and building with LNG under the ground of all cities and villages, and the gas pipes are complexly laid like cobwebs.

Water supply and drainage pipes as well as the gas pipes are also laid under the ground of all residences. Pipes for transmitting a chemical substance to a desired place are laid under a factory for manufacturing a chemical substance. A main pipe through which flows a fluid such as the gas, chemical substance and water is connected to a branch pipe installed to a place requiring the fluid by using the branch apparatus, thus the fluid becomes used at the desired place.

If the fluid is the gas, to convey LNG from the main pipe to a building or house, a branch pipe connected from the main pipe to the building or house is first laid, and finally the main pipe is connected to the branch pipe by using the branch apparatus.

As shown in FIGS. 1 and 2, the conventional branch apparatus 1 for connecting the main pipe to the branch pipe is vertically mounted, whereby a main pipe 2 is connected to a branch pipe 3. Since the branch pipe 3 is positioned at a position higher than the main pipe 2, the branch pipe 3 receives a large load and vibration from the ground, and the branch pipe 3 is easily exposed to the outside during a road repair work, thereby the branch pipe 3 being easily damaged.

In case of using the gas pipe, a depth for laying the gas pipe under the ground is generally prescribed. A laying depth of gas pipe is prescribed to 1.2 meter(s) at a road having a width over 8 meter(s), to 1.0 meter(s) at a road having a width below 8 meter(s), and to 0.6 meter(s) at the residential areas.

As shown in FIG. 2, the gas pipe is buried in both an auxiliary stratum made of sand and gravel and outer stratum made of asphalt pavement. Although it is desirable that the main pipe 2 and the branch pipe 3 are laid at the same depth, he branch pipe 3 should be laid at a higher position than the main pipe 2 because the conventional branch apparatus 1 is a vertical type. A structure of a conventional vertical-type branch apparatus and a branch method using the same will now be described below.

As shown in FIGS. 3 and 4, the conventional vertical-type branch apparatus includes: a T-type pipe 11 having a branch pipe coupling member 11a; a reinforcement plate 12 welded to a lower part of the T-type pipe 11, an inner diameter curvature of which is identical with an outer diameter curvature of the main pipe 2; a flange 13 which is welded an upper part of the T-type pipe 11, and has female screw lines in its center; a plug 14 coupled with the center of the flange 13; a cover 15 coupled with the flange 13; and bolts 16 and nuts 17 for coupling the flange 14 with the cover 15. The branch method for connecting the main pipe 2 and the branch pipe 3 by using the vertical-type branch apparatus will now be described below.

In a first step, referring to FIGS. 1 to 5, the reinforcement plate 12 of the branch apparatus is vertically laid on the main pipe 2 and then welded, and the branch pipe coupling member 11a of the T-type pipe 11 is welded to the branch pipe 3.

In a second step, after a cut-off valve 4 is mounted to an upper part of the flange 13, a piercing machine 8 is mounted to an upper part of the cut-off valve 4.

In a third step, as shown in FIG. 5, the cut-off valve 4 is opened, a saw portion 9 of the piercing machine 8 is descended toward the main pipe 2, and then the saw portion 9 rotates, thereby piercing the main pipe 2.

In a fourth step, the saw portion 9 of the piercing machine 8 and a cut portion 10 of the main pipe 2 are elevated in a main body of the piercing machine 8. The piercing machine 8 has an apparatus for simultaneously elevating the cut portion 10 and the saw portion 9, but this apparatus has no relation with the present invention, so that a description regarding this apparatus is omitted.

In a fifth step, the cut-off valve 4 is closed, the piercing machine 8 is removed from the cut-off valve 4.

In a sixth step, as shown in FIG. 6, a plug adapter 8a is connected to the piercing machine 8, the plug 14 is connected to the plug adapter 8a, and the piercing machine 8 is mounted again to the cut-off valve 4. In a seventh step, the cut-off valve 4 is opened, the piercing machine 8 is then operated, thus the plug 14 is screw-connected to the flange 13.

In an eighth step, after the piercing machine 8 and the cut-off valve 4 are removed from the flange 13, the cover 15 is connected to the flange 13 by using the bolts 16 and nuts 17. As described above, according to the conventional vertical-type branch apparatus and a branch method using this branch apparatus, since the branch pipe 3 is positioned at a position higher than the main pipe 2, the branch pipe 3 receives a large load and vibration from the ground, and thus a crack may occur in the vicinity of a welding portion. Also, since the branch pipe 3 is easily exposed to the outside during a road repair work, thereby the branch pipe 3 may be damaged by a machine such as excavator.

2. SUMMARY OF THE INVENTION

The present invention is directed to a branch apparatus for pipe and a branch method using the same which substantially obviate the above-described problem due to limitations and disadvantages of the related art.

It is an object of the present invention to provide a branch apparatus for a pipe and a branch method using the same which make a laying depth of the main pipe be identical with that of the branch pipe by horizontally installing a branch apparatus, make the branch pipe receive both a low vibration and a small load from a ground, prevent a crack generated in the vicinity of a welding portion, and prevent that the branch pipe is easily exposed to the outside during a road repair work.

In order to realize the above object, a branch apparatus for a pipe according to the present invention includes: a T-type pipe having a horizontal pipe whose both ends are opened and a vertical pipe connected to an upper part of a center of the horizontal pipe; a reinforcement plate welded to one end of the horizontal pipe of the T-type pipe; a flange which is welded to an upper part of the vertical pipe of the T-type pipe, and has female screw lines in a center thereof; and a plug coupled with the center of the flange. A branch method using the branch apparatus according to the present invention includes the steps of: positioning a reinforcement plate of a branch apparatus to one side of a main pipe of a desired branch point, and welding both a circumferential edge of the reinforcement plate and the main pipe; welding a branch pipe previously mounted to other end of a horizontal pipe of a T-type pipe with the same depth as the main pipe; mounting a cut-off valve to a flange; mounting a piercing machine to an upper part of the cut-off valve; opening the cut-off valve, descending an angular head of the piercing machine, moving a saw portion toward the main pipe, and piercing the main pipe; moving the saw portion and a cutting portion of the main pipe toward the angular head, and elevating the angular head in a main body of the piercing machine; closing the cut-off valve, and removing the piercing machine; removing the angular head from a driving shaft of the piercing machine, connecting a plug adapter and a plug inserted a sealing member therein to the piercing machine, and mounting again the piercing machine to the cut-off valve; opening the cut-off valve, rotating the driving shaft of the piercing machine, and screw-coupling the plug to the flange; separating the plug adapter from the plug by elevating the driving shaft of the piercing machine, and piercing machine, and removing the piercing machine from the cut-off valve; and removing the cut-off valve from the flange.

Additional features and advantages of the invention will be set forth in the description which follows, and in part will be apparent from the description, or may be learned by practice of the invention. The objective and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

3. BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the drawings:

4. DETAILED DESCRIPTION OF THE PREFERRED EMBODIMENT

Reference will now be made in detail to the preferred embodiment of the present invention, examples of which are illustrated in the accompanying drawings.

Figure 1:
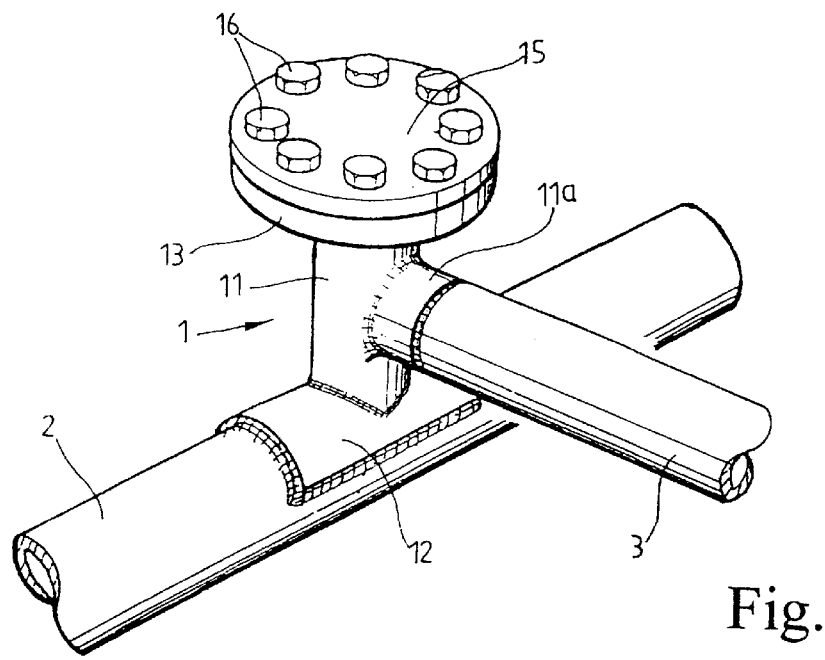
FIG. 1 is a perspective view illustrating that a main pipe is connected to a branch pipe by using a conventional vertical-type branch apparatus.
Figure 2:
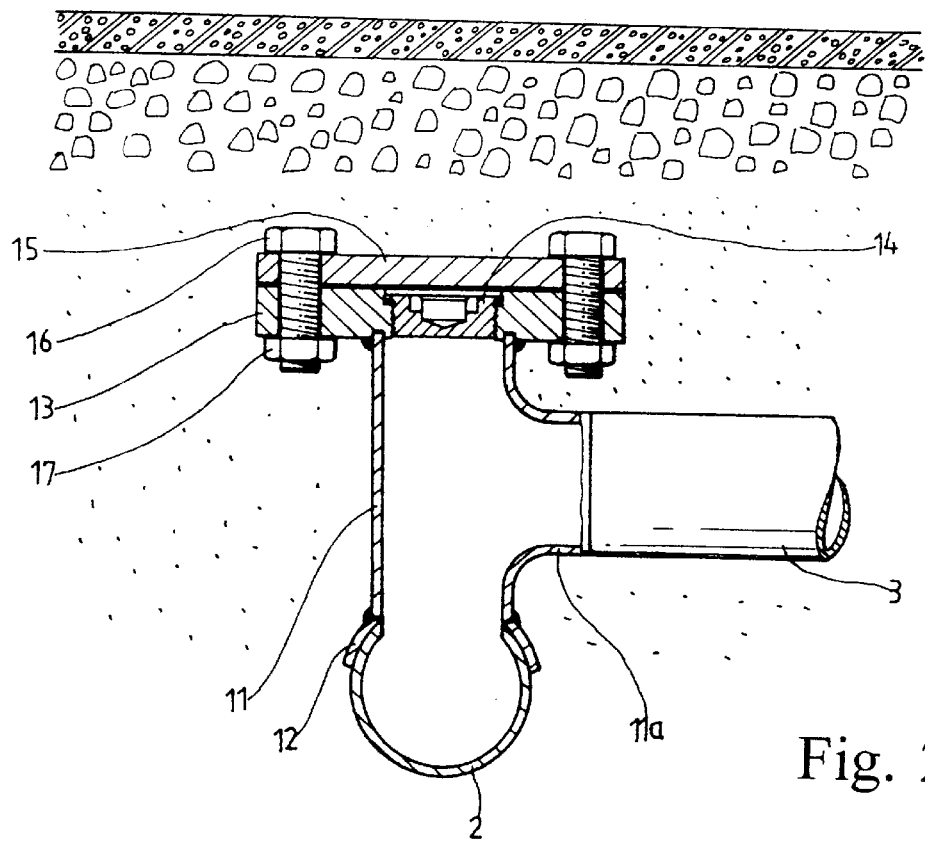
FIG. 2 shows that the main pipe and the branch pipe are buried under the ground according to the conventional method.
Figure 3:
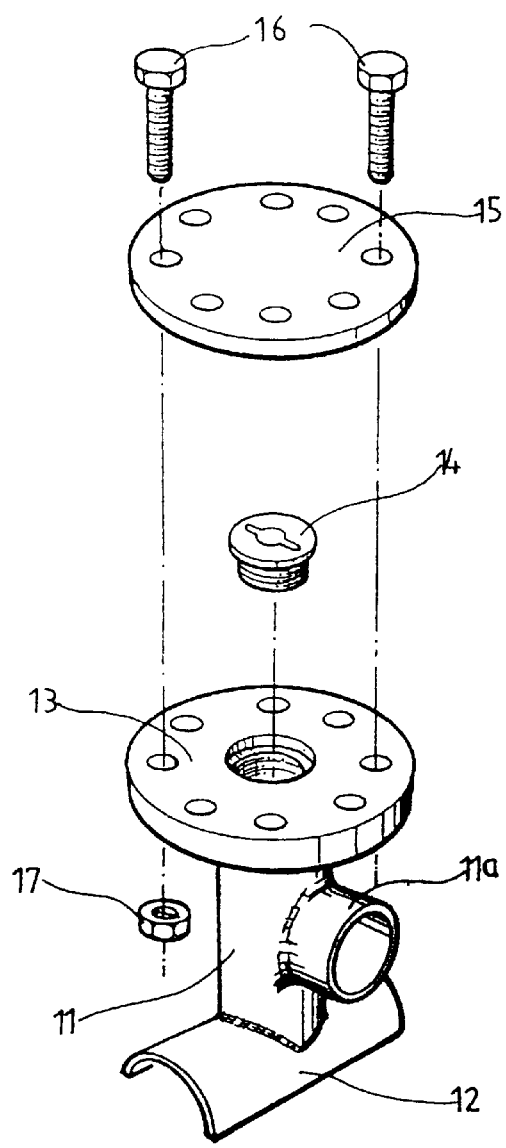
FIG. 3 is a fragmentary perspective view illustrating the conventional vertical-type branch apparatus.
Figure 4:
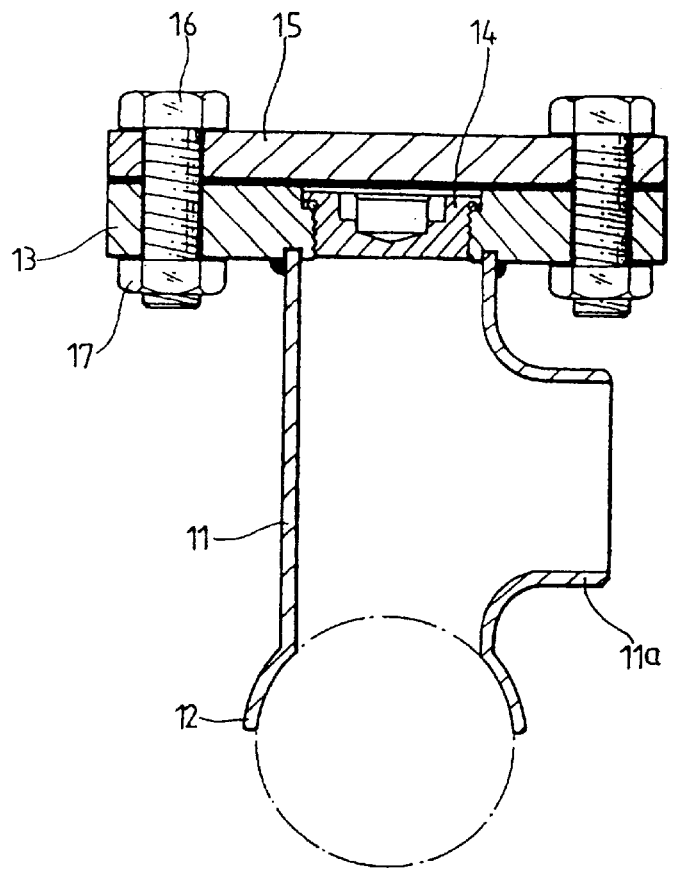
FIG. 4 is a cross-sectional view illustrating a coupling state of the conventional branch apparatus.
Figure 6:
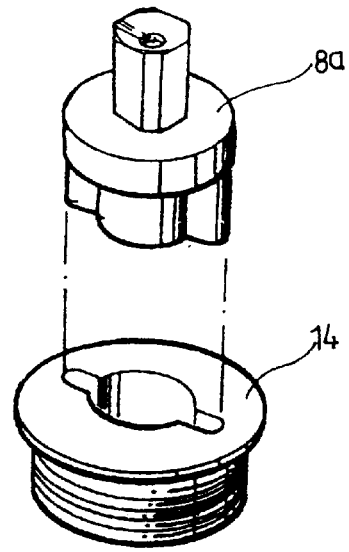
FIG. 6 is a perspective view illustrating both a plug included in the conventional branch apparatus and a plug adapter connected to the plug.
Figure 5:
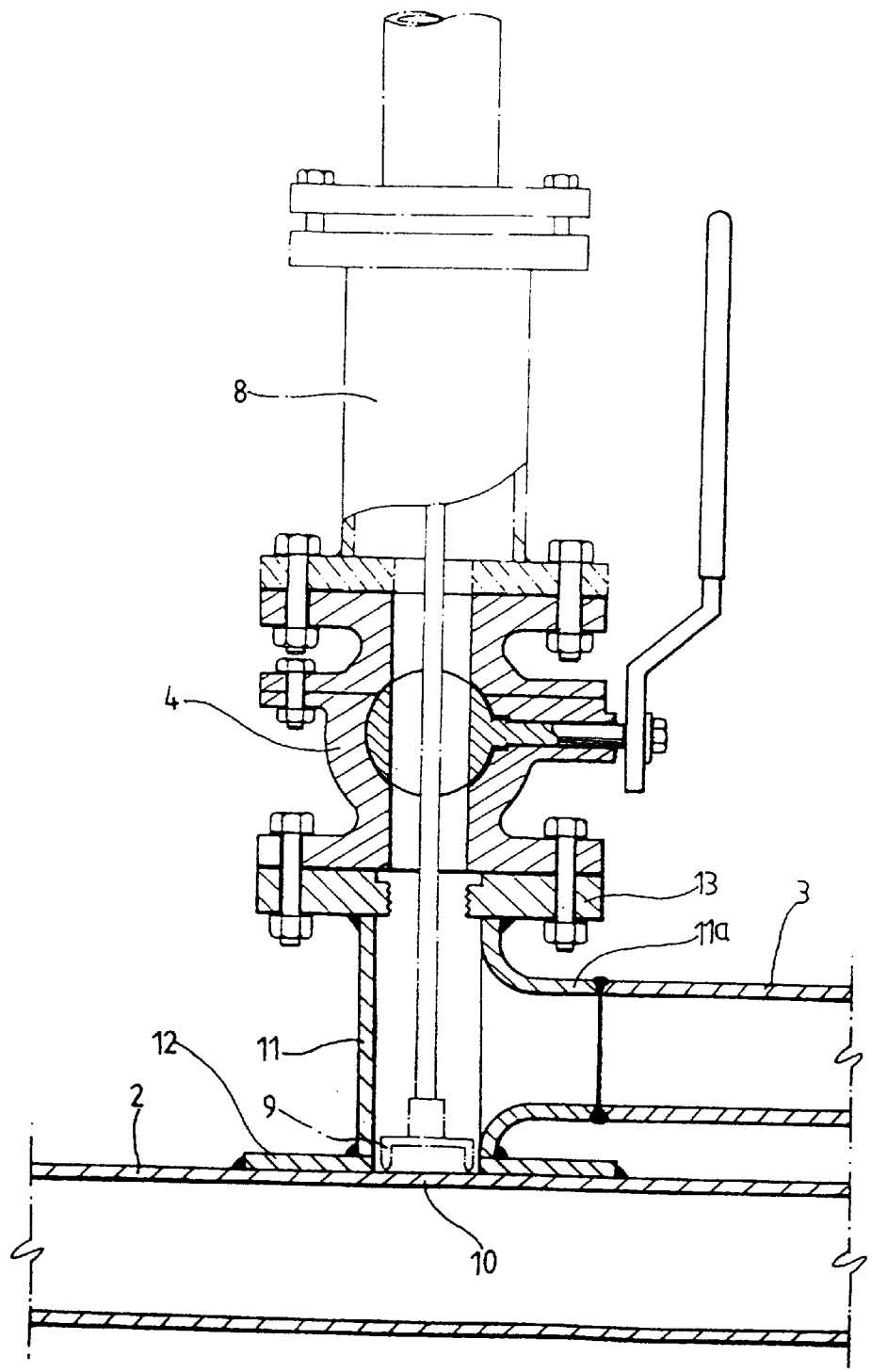
FIG. 5 is a cross-sectional view illustrating that the main pipe is pierced by the conventional branch apparatus.
Figure 7:
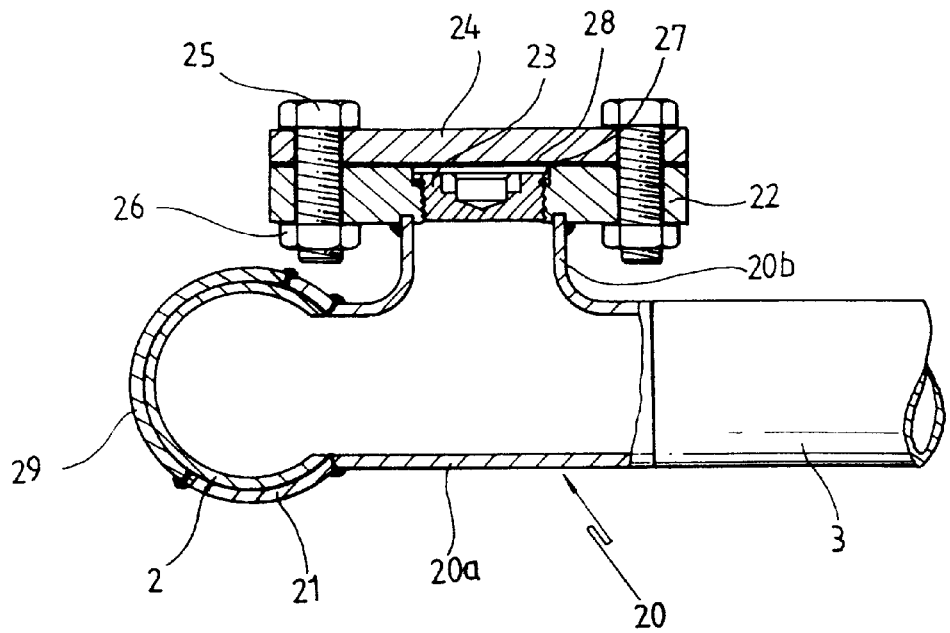
FIG. 7 is a cross-sectional view illustrating a coupling state of a branch apparatus in accordance with a preferred embodiment of the present invention.
Figure 8:
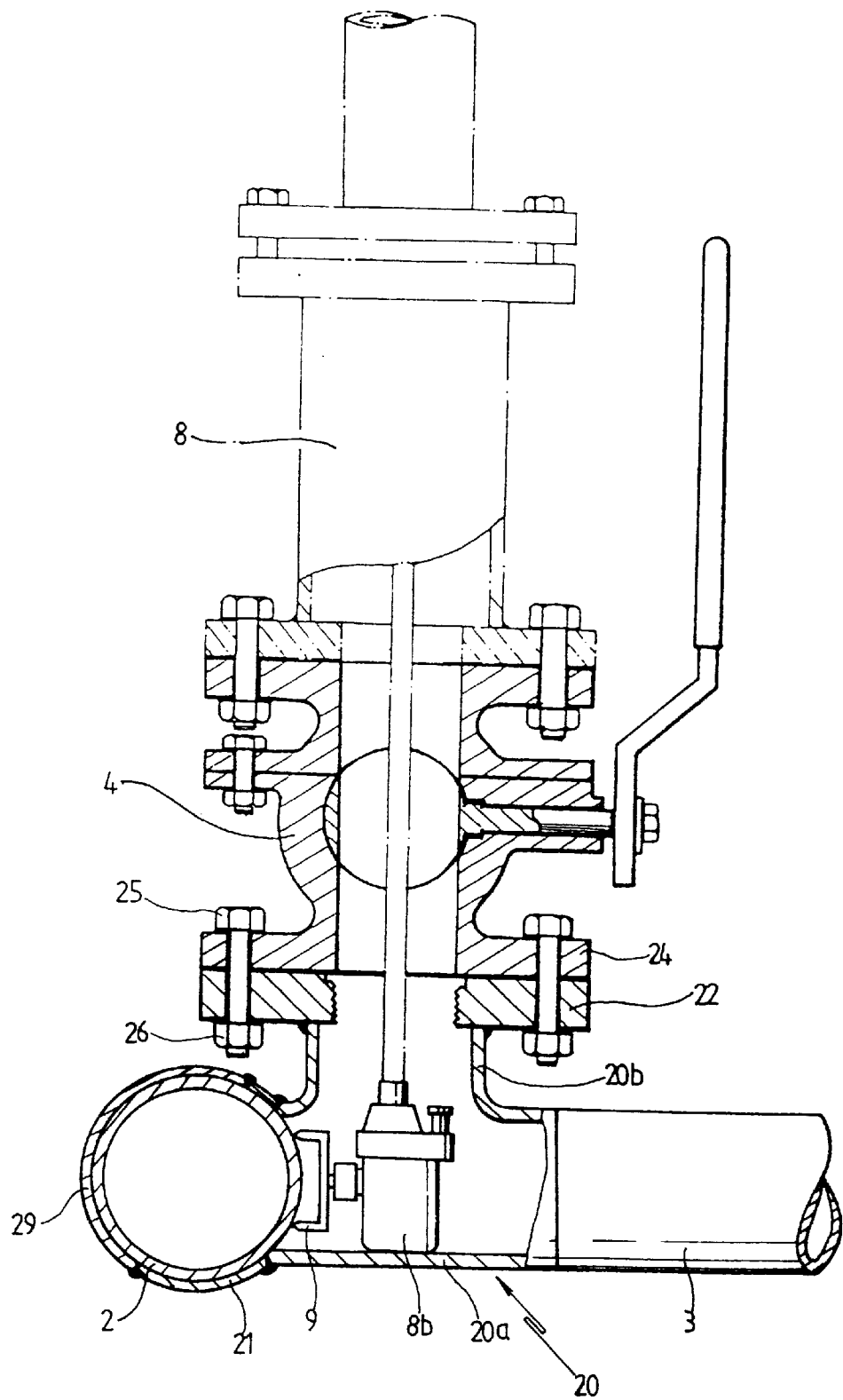
FIG. 8 is a cross-sectional view illustrating that a main pipe is pierced by the branch apparatus in accordance with a preferred embodiment of the present invention.

FIG. 7 is a cross-sectional view illustrating a coupling state of a branch apparatus in accordance with a preferred embodiment of the present invention; and FIG. 8 is a cross-sectional view illustrating that a main pipe is pierced by the branch apparatus in accordance with a preferred embodiment of the present invention.

As shown in FIGS. 7 and 8, a branch apparatus in accordance with a preferred embodiment of the present invention includes a T-type pipe 20 having a horizontal pipe 20a whose both ends are opened and a vertical pipe 20b connected to an upper part of a center of the horizontal pipe 20a; a reinforcement plate 21 welded to a main pipe 2, for being welded to one end of the horizontal pipe 20a of the T-type pipe 20; a flange 22 which is welded to an upper end of the vertical pipe 20b of the T-type pipe 20, and has female screw lines in a center thereof; and a plug 23 coupled with the center of the flange 22.

Also, the branch apparatus includes a cover 24 which is connected to the flange 22 by bolts 25 and nuts 26. A sealing member 27 is inserted between the plug 23 and the flange 22 in order to achieve a sealing therebetween. A gasket 28 is inserted between the cover 24 and the flange 22.

To securely reinforce the pierced main pipe 2, it is desirable that an additional reinforcement plate 29 is welded to an opposite side of the reinforcement plate 21.

Figure 10:
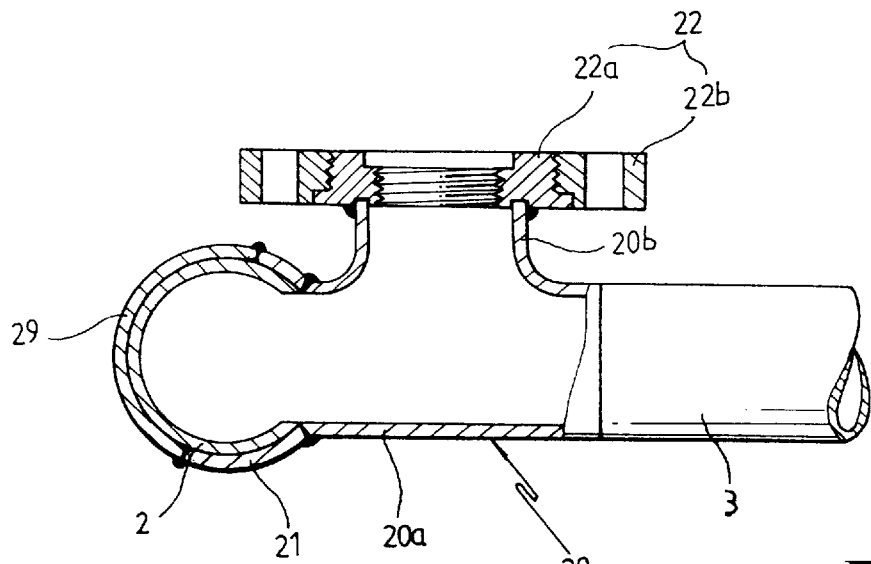
FIG. 10 is a cross-sectional view illustrating a state for performing a branch work by using the branch apparatus of FIG. 9 in accordance with another preferred embodiment of the present invention.

As shown in FIG. 10, the flange 22 is divided into two portions, i.e., a center portion 22a having female screw lines for the plug 23's screw-coupling and male screw lines formed to its external side wall, and an edge portion 22b screw-coupled to an external side wall of the center portion 22a.

Figure 9:
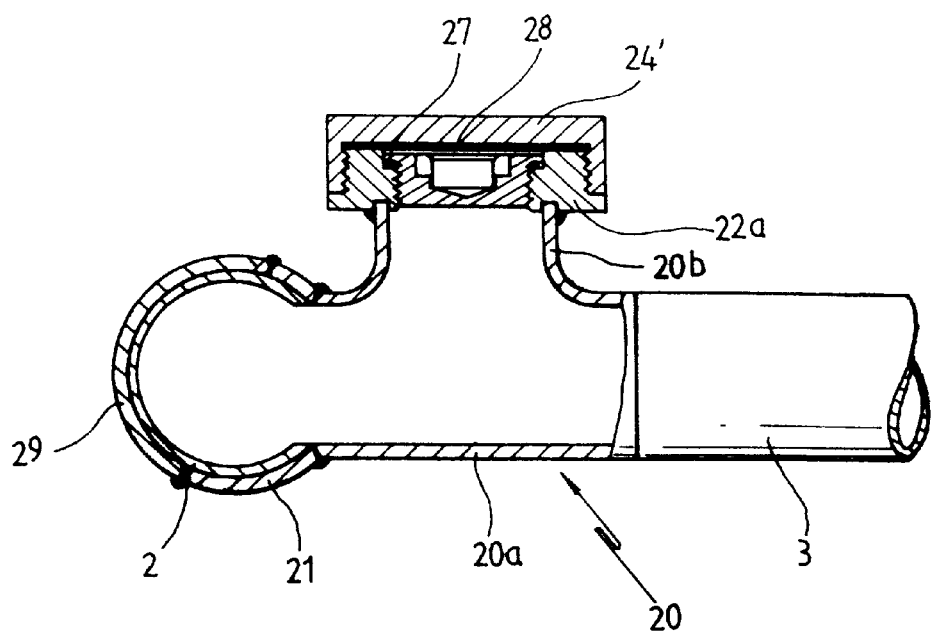
FIG. 9 is a cross-sectional view illustrating a coupling state of a branch apparatus in accordance with another preferred embodiment of the present invention.

In this case, as shown in FIG. 9, the edge portion 22b is removed after finishing the branch work, a cover 24' having female screw lines is then coupled on behalf of the edge portion 22b, thereby reducing an entire size. At this time, it is desirable that the sealing member 27 and the gasket 28 are used to achieve a sealing.

To facilitate a welding operation, a lower end of the reinforcement plate 21 is extended toward an opposite side of the main pipe 2. Accordingly, the reinforcement plate 21 is not welded to the bottom of the main pipe 2, thereby facilitating the welding operation.

A second preferred embodiment of the present invention relates to a branch apparatus used in case that a pipe's diameter is relatively short, a fluid pressure is relatively low, and the main pipe 2 and the branch pipe 3 are made of a plastic material. The branch apparatus used in the second preferred embodiment is made of plastics.

Figure 11:
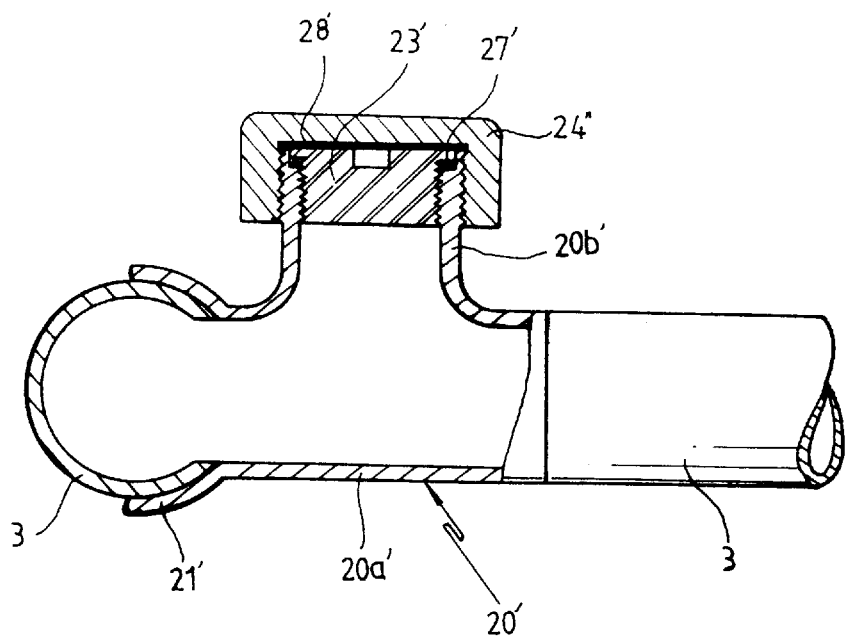
FIG. 11 is a cross-sectional view illustrating a coupling state of a branch apparatus in accordance with a still another preferred embodiment of the present invention.

As shown in FIG. 11, the branch apparatus according to the second preferred embodiment includes: a T-type pipe 20' which includes a horizontal pipe 20a' whose both ends are opened, and a vertical pipe 20b' which is connected to an upper part of a center of the horizontal pipe 20a' and has screw lines formed to inner and outer parts of the vertical pipe 20b's upper part; a reinforcement plate 21' welded to the main pipe 2, for being welded to one end of the horizontal pipe 20a' of the T-type pipe 20'; a plug 23' being screw-coupled with the inner part of the upper part of the vertical pipe 20b' of the T-type pipe 20'; and a cover 24" being screw-coupled with the outer part of the upper end of the vertical pipe 20b' of the T-type pipe 20'.

In the second preferred embodiment of the present invention, a sealing member 27' is inserted between the plug 23' and the vertical pipe 20b' of the T-type pipe 20' in order to achieve a sealing therebetween. A gasket 28' is inserted between the cover 24" and the vertical pipe 20b' of the T-type pipe 20'.

A branch method for connecting the main pipe 2 to branch pipe 3 by using the above branch apparatus will now be described below.

As shown in FIG. 7, the branch method according to the present invention includes the steps of: positioning a reinforcement plate 21 of a branch apparatus to one side of a main pipe 2 of a desired branch point, and welding both a circumferential edge of the reinforcement plate 21 and the main pipe 2; welding a branch pipe previously mounted to the other end of a horizontal pipe 20a of a T-type pipe 20 with the same depth as the main pipe 2; mounting a cut-off value 4 of FIG. 8 to a flange 22; mounting a piercing machine 8 to an upper part of the cut-off valve 4.

Then, the branch method connects an angular head 8b to a driving shaft of the piercing machine 8, and mounts a saw portion 9 to an output shaft of the angular head 8b. The angular head 8b well known to those skilled in the art, generally receives a torque from the driving shaft of the piercing machine 8, extends the output shaft of the angular head 8b toward a shaft direction (i.e., a horizontal direction), and then rotates. For example, an angular head (Model No. BT40-AH12-150 or BT50-AH25-200) made by 'KURODA Precision Machinery Corporation' in Japan can be used in the present invention. Sequentially, the branch method opens the cut-off valve 4, descends the angular head 8b of the piercing machine 8, moves the saw portion 9 toward the main pipe 2, and thus pierces the main pipe 2.

The branch method moves the saw portion 9 and a cutting portion of the main pipe 2 toward the angular head 8b by reversely rotating the driving shaft of the piercing machine 8, and elevates the angular head 8b in a main body of the piercing machine 8.

Next, the branch method closes the cut-off valve 4, and removes the piercing machine 8 from the cut-off valve 4. Then, the branch method removes the angular head 8b from the driving shaft of the piercing machine 8, uses a plug adapter 8a on behalf of the angular head 8b, connects a plug 23 having a sealing member 27 to the plug adapter 8a, and thus mounts again the piercing machine 8 to the cut-off valve 4.

The branch method opens the cut-off valve 4, rotates the driving shaft of the piercing machine 8, and screw-couples the plug 23 to the flange 22. And, the branch method separates the plug adapter 8a from the plug 23 by elevating the driving shaft of the piercing machine 8, removes the piercing machine 8 from the cut-off valve 4, and then removes the cut-off valve 4 from the flange 22.

A coupling between the main pipe 2 and the branch pipe 3 can be completed by the aforementioned method. However, in order to more reliably achieve a sealing, the cover 24 is connected to an upper part of the flange 22 by using the bolts 25 and the nuts 26. At this time, the gasket 28 is positioned between the cover 24 and the flange 22. To securely reinforce the main pipe 2, an additional reinforcement plate 29 is welded to an opposite side of the reinforcement plate 21. The aforementioned state is shown in FIG. 7.

In the second preferred embodiment shown in FIGS. 9 and 10, as described above, the plug 23 is screw-coupled with a center portion 22a of the flange 22, the piercing machine 8 and the cut-off valve 4 are removed, and then the edge portion 22b is removed from the center portion 22a. The cover 24' is screw-coupled with the center portion 22a. At this time, it is desirable that the gasket 28 is inserted between the center portion 22a and the cover 24' in order to achieve a sealing therebetween. As shown in FIG. 11, the main pipe 2 and the branch pipe 3 have a small diameter and a low fluid pressure. Accordingly, even if some fluids are leaked cut, the quantity of the leakage fluids is very little, so that the cut-off valve 4 is not used. That is, the main pipe 2 is pierced by using the piercing machine 8 and the angular head 8b, the plug 23' having a sealing member 27' is manually screw-coupled with an inner part of the vertical pipe 20b' of the T-type pipe 20'.

The cover 24" is screw-coupled to an outer part of the vertical pipe 20b' of the T-type pipe 20' with the gasket 28' therebetween.

As described above, a branch apparatus for a pipe and a branch method using the same locate the branch apparatus 3 and the main pipe 2 at the same horizontal position, separate the branch apparatus 3 from the ground by a prescribed distance, make the branch pipe 3 receive both a low vibration and a small load from a ground, prevent a crack generated in the vicinity of a welding portion, and prevent that the branch pipe 3 is easily exposed to the outside during a road repair work.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. In a branch apparatus for a pipe for connecting a main pipe to a branch apparatus, the branch apparatus comprising:

a T-type pipe having a horizontal pipe whose both ends are opened and a vertical pipe connected to an upper part of a center of the horizontal pipe;

a reinforcement plate adapted to be welded to one side of the main pipe, for being welded to one end of the horizontal pipe of the T-type pipe;

a flange which is welded to an upper end of the vertical pipe of the T-type pipe, and has female screw lines in a center of the flange; and a plug coupled with the center of the flange.

2. A branch apparatus according to claim 1, wherein the flange includes:

a center portion having male screw lines formed on an external side wall of the center portion; and an edge portion being screw-coupled to the external side wall of the center portion.

3. A branch apparatus according to claim 1, wherein the reinforcement plate extends its lower end toward an opposite side of the main pipe in order to facilitate a welding operation.

* * * * *